July 2, 1929.  P. H. F. SPIES  1,719,568
NUT MAKING MACHINE
Filed Jan. 8, 1926  6 Sheets-Sheet 4
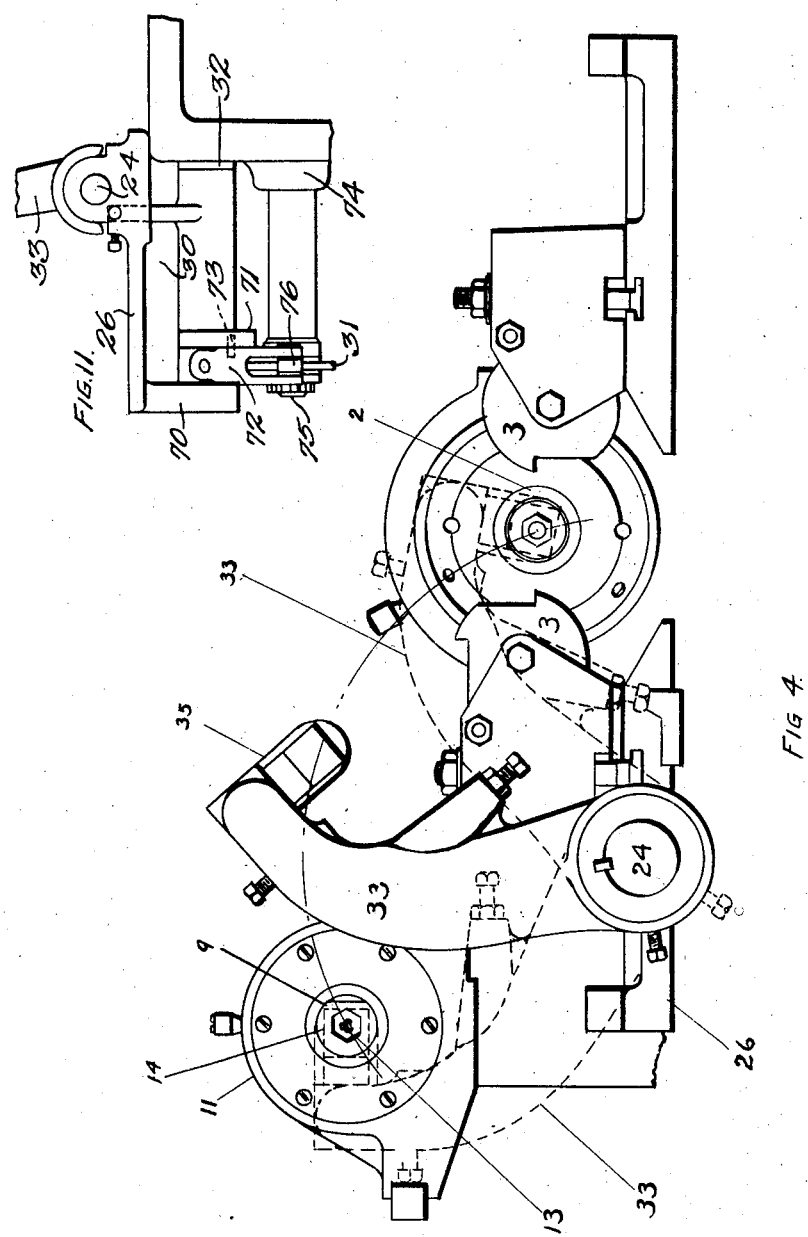
INVENTOR
Peter H. F. Spies
By: Charles H. Riches
Atty

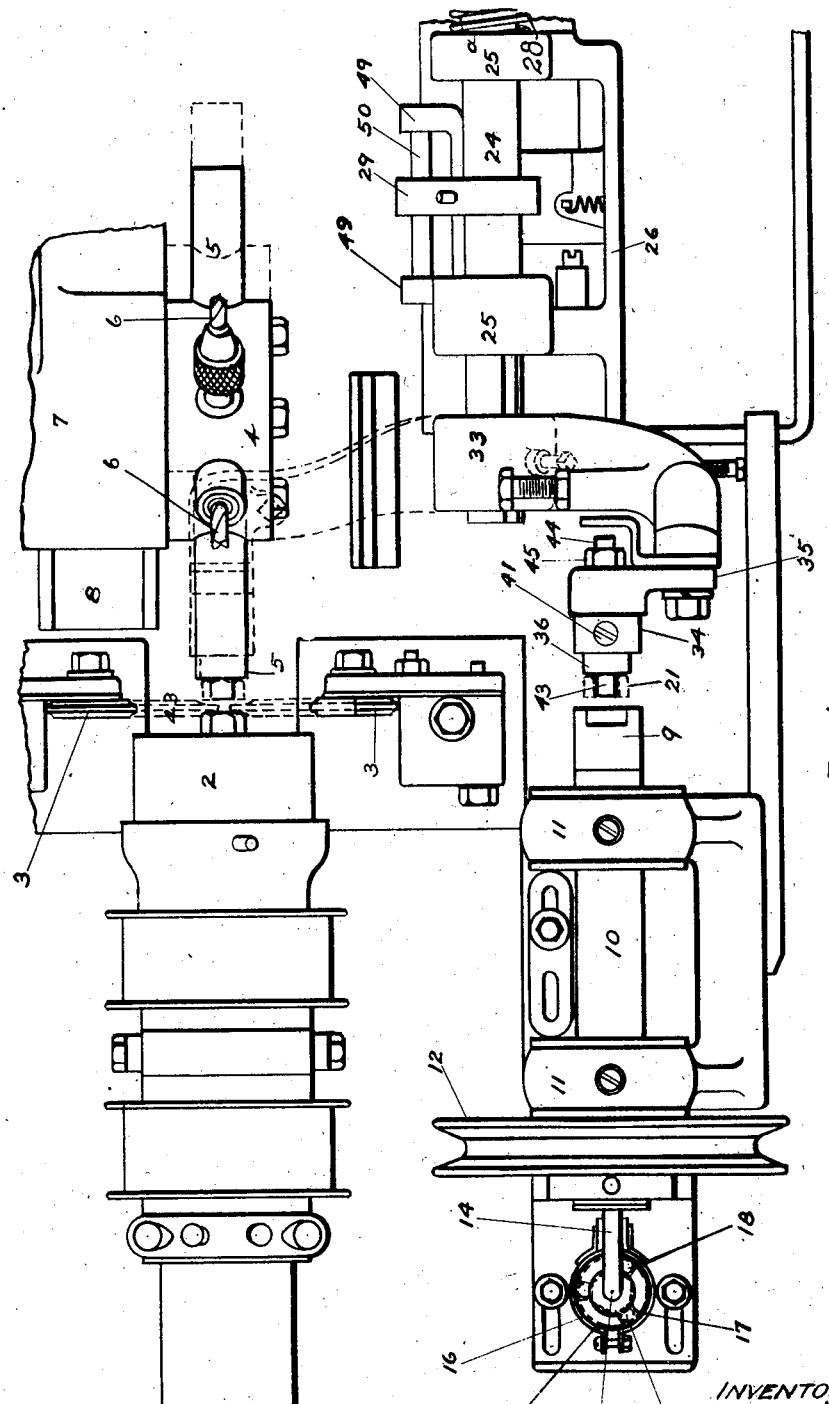

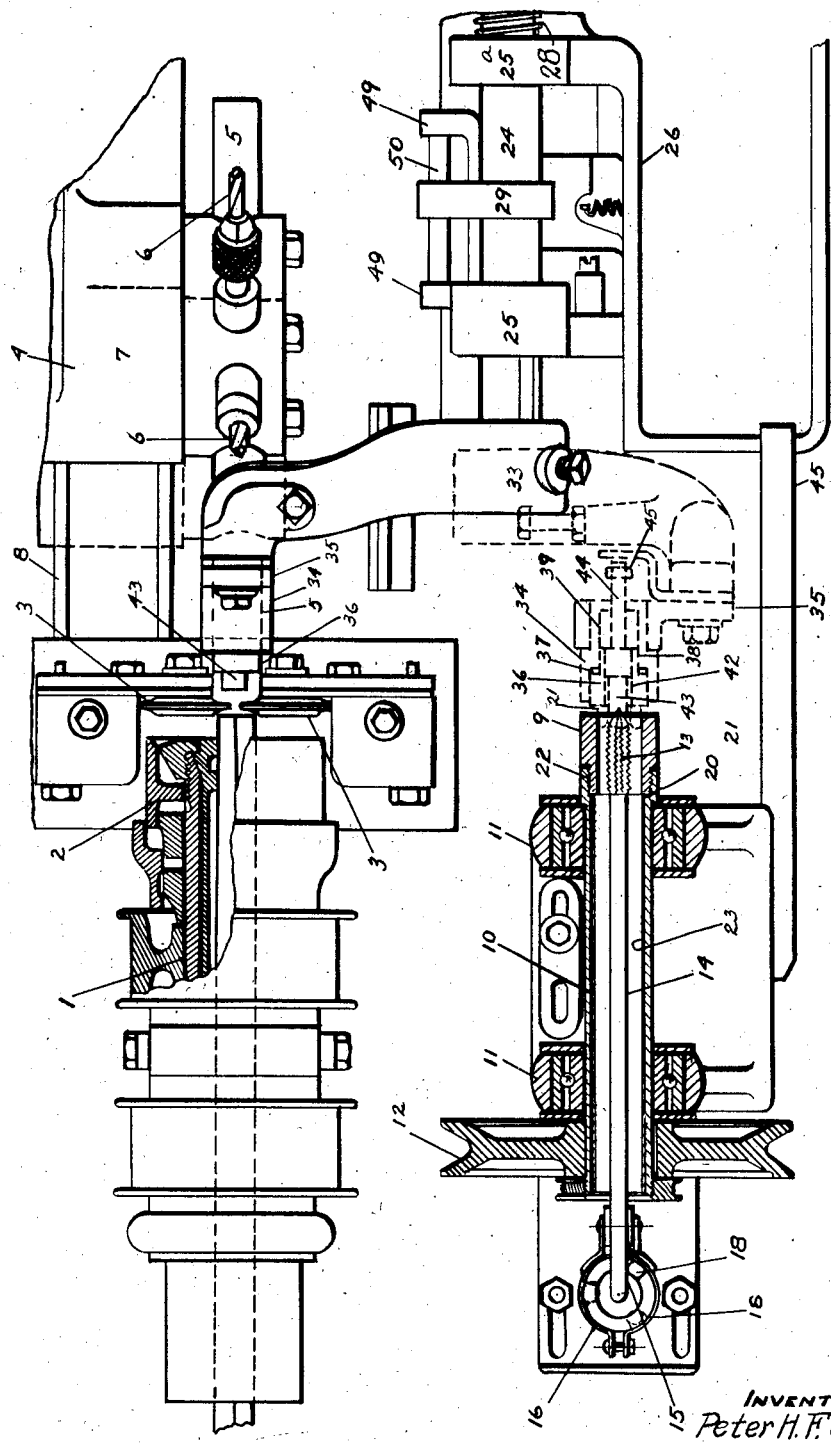

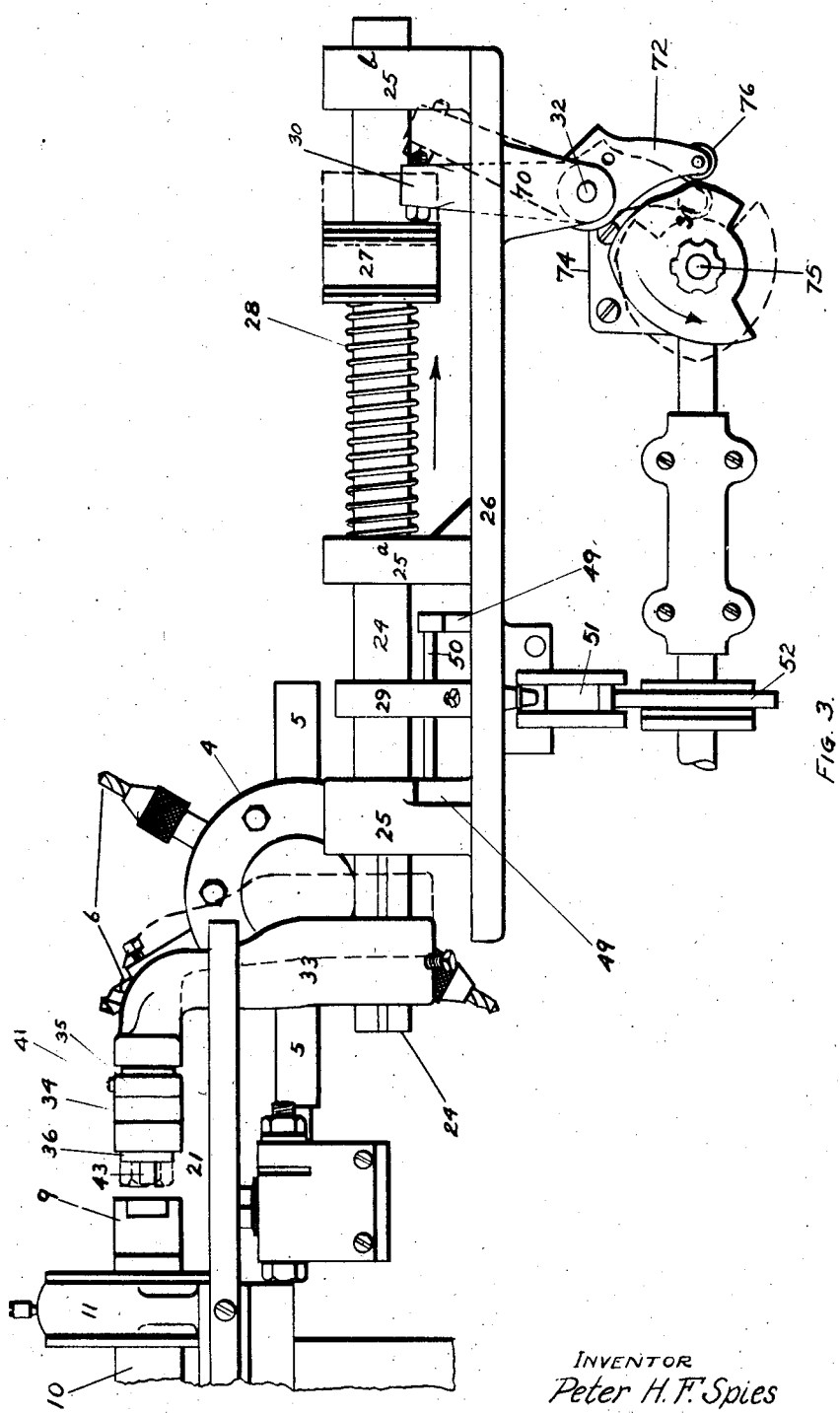

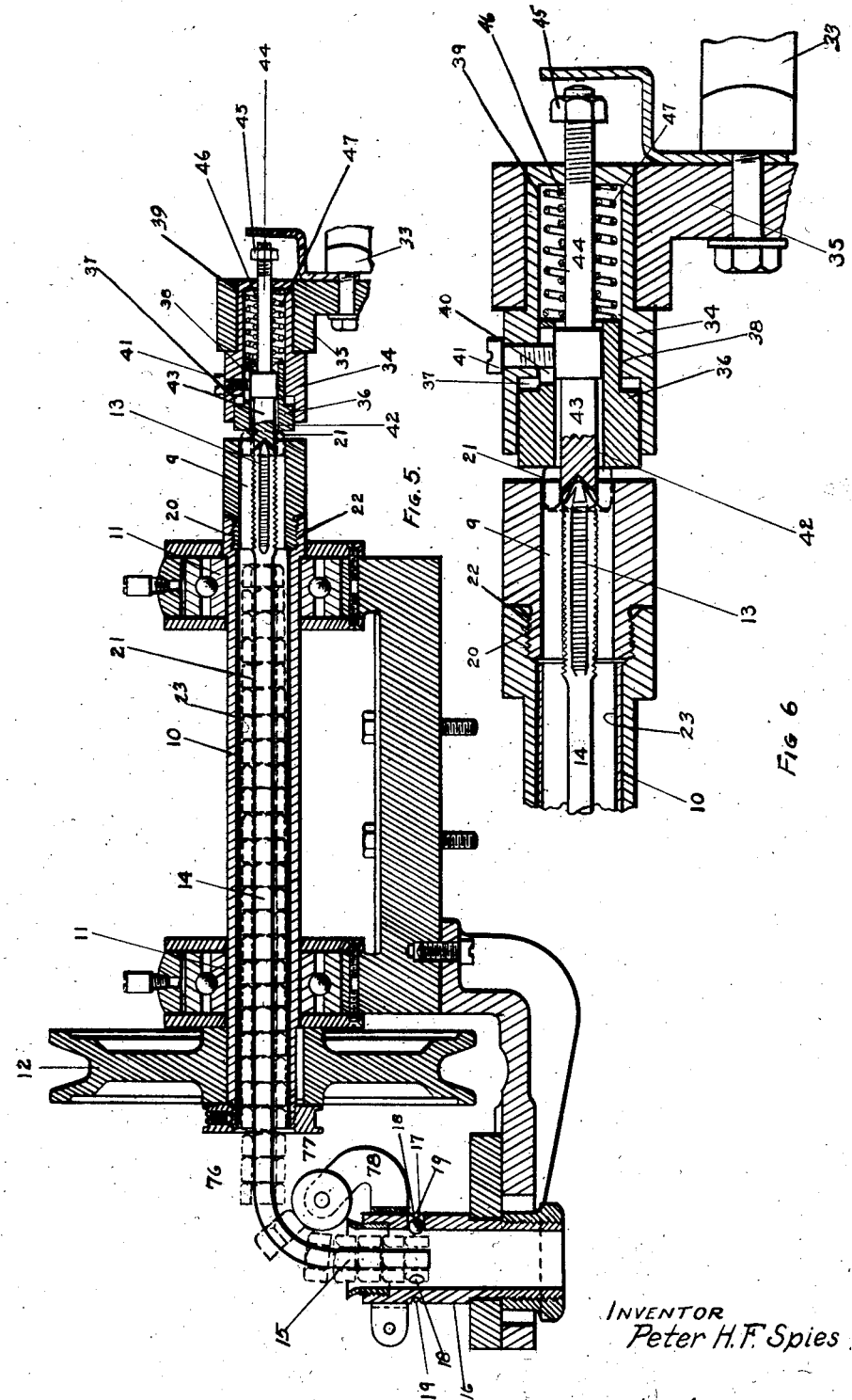

July 2, 1929.  P. H. F. SPIES  1,719,568
NUT MAKING MACHINE
Filed Jan. 8, 1926  6 Sheets-Sheet 6
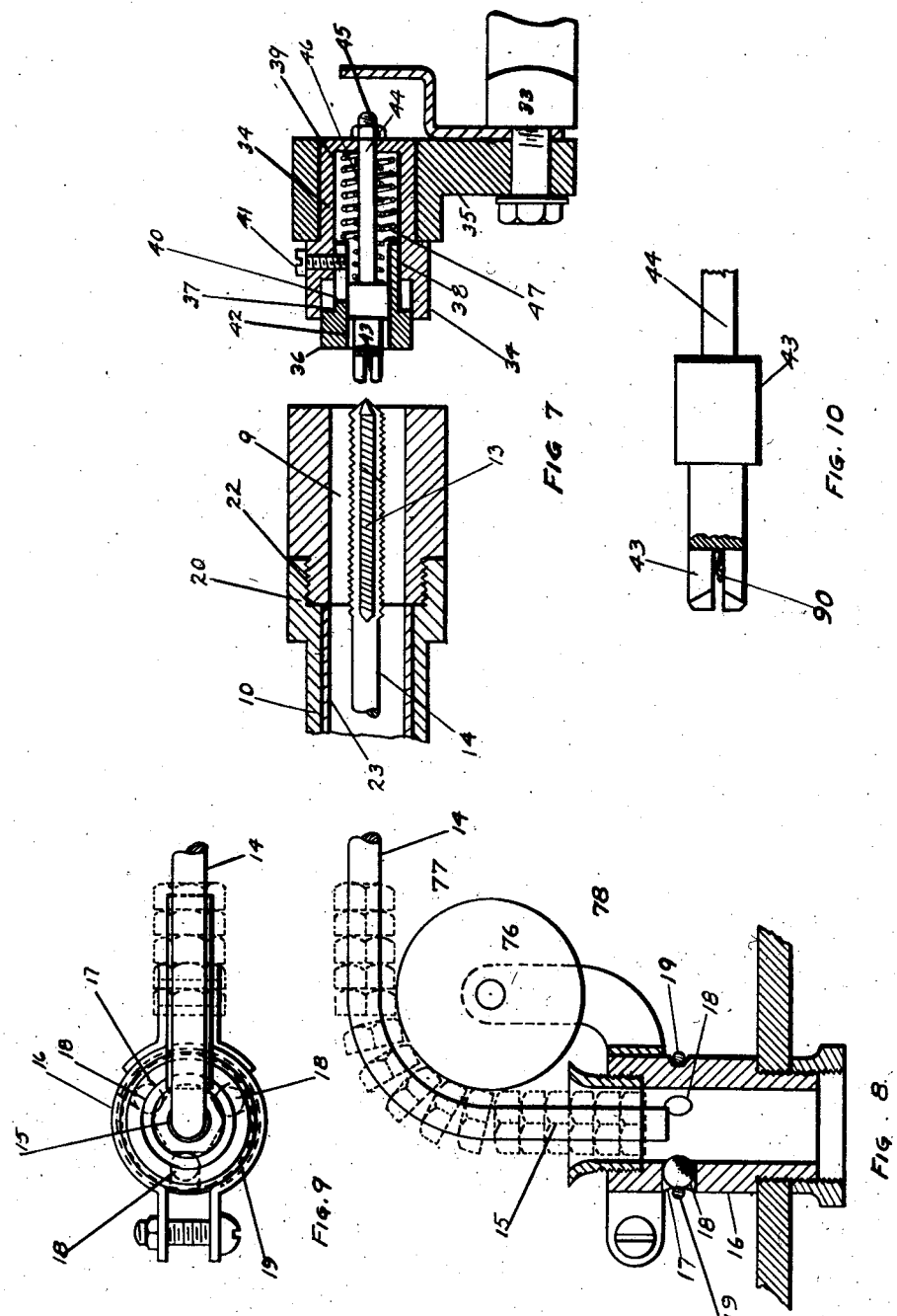
INVENTOR
Peter H. F. Spies
By: Charles H. Riches
Atty Patented July 2, 1929.

1,719,568

UNITED STATES PATENT OFFICE.

PETER H. F. SPIES, OF BUFFALO, NEW YORK, ASSIGNOR TO AUTOMATIC NUT-THREAD CORPORATION, OF BUFFALO, NEW YORK, A CORPORATION OF NEW YORK.

NUT-MAKING MACHINE.

Application filed January 8, 1926. Serial No. 80,060.

This application is a continuation in part of my applications for Letters Patent of the United States Serial Number 746,018 filed October 27, 1924, and Serial Number 49,698 filed August 12, 1925.

My invention relates to a machine in which two separate and independent operations, simultaneously carried on, are coordinated by a third operation into a continuous and automatic nut making process.

These operations include,—(a) making the nut blank; (b) transferring it to the tapping mechanism; and (c) threading its bore. While a specially designed apparatus may be employed for automatically performing these successive operations, it is advantageous to use some standard type of machine suitable for blank making purposes, equip it with thread cutting means, adjacent to but separate from the blank making means, and provide it with a moving carrier, whose motion is synchronized with the action of the blank making means, for automatically transferring the nut blanks from the blank making operation to the tapping operation. The blank making operation may be effected either by punching the nut blanks from the material, or by automatically feeding, boring, and cutting the material and finishing the nut blanks ready for the tapping operation, and may include any known means suitable for this purpose.

The tapping operation may be effected in various ways and by any suitable thread cutting device. In a convenient embodiment of the invention, the thread cutting means comprises a chuck, conforming in cross section to the external shape and measurement of the nut, and terminating in an elongated tubular sleeve. A floating tap, formed with an elongated shank or arm, is located in and extends axially of the chuck and sleeve, and this tap enters the bore of the nut blank and threads it when the latter is delivered into the chuck. During the threading operation the nut moves axially of the tap and, when the threading operation is finished, passes to the elongated shank or arm. The arm is of smaller diameter than the tap, for the free movement of the finished nut axially thereof and the bore of the sleeve is of such relative shape and cross-sectional dimension to the external shape and dimension of the nut as to permit of its free movement from the tap to the delivery end of the shank. The threaded nuts, as they move along the shank or arm, engage the bore of the sleeve, and support the shank in it so that the tap will be approximately in line with the center of the bore of the nut blank when entered within the chuck. Either the tap or the chuck and sleeve may be rotated for the cutting of the thread, but it is preferable to rotate the chuck and sleeve, and in that case the tap is prevented from rotating. For this purpose the end of the shank or arm is extended beyond the sleeve and bent at an angle to the axis of the tap, and the bent end of the arm is entered in a stationary guide angularly disposed to the chuck and sleeve. The internal diameter of the guide is of corresponding cross-sectional dimension to the nut, and when the nuts are delivered by the threading operation from the tap to the shank, each nut is pushed in succession, to its bent end, and, through the guide, and the nuts in passing through the guide limit the lateral, axial, and rotational movements of the shank and tap.

To coordinate the operation of making the nut blank and the operation of threading it, and combine them into a continuous process of manufacture, the nut making apparatus is provided with an automatic carrier for transferring the nut blanks from the blank making operation to the threading operation, and entering each nut blank in succession within the chuck. This transfer or carriage of the nut blanks from the one operation to the other may be effected in various ways and by various mechanical or electro-mechanical means.

One means by which the transfer can be successfully effected comprises a carrier whose movements are timed to synchronize with the various stages of the nut blank making operation. This carrier in the construction hereinafter described consists of an arm which oscillates intermittently between the nut blank making operation and the tapping operation. At the blank making limit of its oscillation it reciprocates forwardly to receive the nut blank from the blank making mechanism, and then reverses its oscillation, but maintains its advanced reciprocation, to carry the nut blank to the thread cutting mechanism. At the thread cutting limit of its oscillation it advances to the limit of its forward reciprocation and enters the nut blank in the chuck of the tapping mechanism. When a sufficient time period has elapsed for the delivery of the nut blank to the tapping mechanism, it moves to the reverse limit of its reciprocation to be, during its next oscillation, entirely clear of the tapping mechanism and the nut blank mechanism. To insure a positive delivery of the nut blank to the tapping mechanism, the oscillatory arm is provided with a spring pressed pin or mandrel, which enters the bore, and with a spring pressed plunger which bears against the face, of the nut blank. When the nut blank is released by the blank making operation this pin carries it to the chuck of the tapping mechanism and the spring pressed plunger yieldingly presses and maintains it against the chuck until the nut blank enters into the chuck and the tap commences to thread it. Instead of using an oscillatory arm for the carriage of the nut blanks from the one operation to the other, the transfer mechanism may take the form of a reciprocating carrier, or a continuously or intermittently rotating carrier, or a continuously or intermittently travelling carrier, or an electro-mechanical device whose movements are so timed as to synchronize with the timing of the blank making operation, and these transfer devices may be designed for use in connection with a machine employed to make one nut blank at a time or to make a plurality of nut blanks simultaneously.

The tapping mechanism is designed so that it can be employed for a wide range of nut sizes and this is conveniently effected by using a sleeve, suitable for the maximum nut size, and providing it with detachable and interchangeable chucks and removable and interchangeable linings, corresponding to the dimensions of the smaller nut sizes, and by using interchangeable guides controlling the delivery of the finished nuts. Each of these guides is constructed with means for retarding the delivery of the nuts from the tapping mechanism until they are pushed through the guide by the pressure of the nuts behind them, and in the preferred construction the guide is provided with a plurality of apertures through which are partially entered spring pressed anti-friction balls projecting into the bore of the guide and yieldingly engaging and temporarily detaining the nuts.

For an understanding of my invention reference is to be had to the following description and to the accompanying drawings in which:—

Fig. 1 is a plan view of a nut making machine suitable for the purpose of this invention, showing in dotted lines the position of the parts when the transfer mechanism has been oscillated to the blank making mechanism and advanced to enter the nut blank and in full lines the position of the parts when the transfer mechanism has been oscillated to the tapping mechanism prior to being further advanced to enter the nut blank in the chuck, Fig. 2 is a plan view partly in section showing in full lines the reciprocation of the transfer mechanism to receive the nut blank from the blank making mechanism and showing in dotted lines the transfer mechanism moved to the limit of the advanced reciprocation and entering the nut blank in the chuck of the tapping mechanism, Fig. 3 is a fragmentary side elevation of the apparatus shown in the preceding views, with the transfer mechanism oscillated to the tapping position and in the same reciprocated position as shown in Fig. 1.

Fig. 4 is a sectional end elevation showing in full lines the transfer mechanism moving between the two operations, and in dotted lines the limits of its oscillations, Fig. 5 is a fragmentary longitudinal section showing the tapping mechanism, the transfer mechanism moved to the limit of its advanced reciprocation, and the nut blank entered in the chuck, Fig. 6 is a fragmentary longitudinal section of the transfer mechanism and the tapping mechanism, on a larger scale than the preceding views, showing the nut entered in the chuck of the tapping mechanism, Fig. 7 is a similar view to Fig. 6, showing the retracted position of the transfer mechanism, Fig. 8 is a vertical section of the stationary guide, Fig. 9 is a plan view of the guide, and Fig. 10 is a detail view of an expanding pin or mandrel for the transfer mechanism, Fig. 11 is a side view of the transfer mechanism.

Like letters of reference refer to like parts throughout the specification and drawings.

In the apparatus hereinafter described as one embodiment of the invention, the material from which the nut blanks are made is fed to the blank making operation and takes the form of long metallic bars of a size and geometric shape corresponding respectively to the dimensions and the number of facets of the finished nut, but it may take the form of unfinished nut blanks punched out or otherwise made to the required size and shape for the finished nut. This bar material is automatically fed to the nut blank making mechanism which may be either a specially designed machine or a machine of standard type ordinarily employed for nut making purposes. This latter type of machine comprises a feed guide 1, a chuck 2 through which the material is automatically fed in the process of manufacture, and two opposed cutters 3 for facing the nut blank and severing it from the remainder of the bar when the boring stage of the operation is completed. As the feed guide, chuck, and cutters are common to all standard nut making machines, it will not be necessary to specifically describe their structural details or their mode of operation, as per se they constitute no part of the invention further than to perform their usual functions of feeding, holding and cutting the blank material.

Opposed to the chuck 2 is a turret 4 provided with stopping tools 5 and boring tools or drills 6 arranged for the successive operations. The turret 4 is rotatably mounted on a turret slide 7 which alternately and intermittently moves towards and away from the chuck 2 during the operation of the machine, to bring the turret tools successively into engagement with the material. The first action of the turret is to present a stopping tool 5 to the blank material and arrest the movement of the material when a requisite length has been delivered beyond the chuck 2.

The turret then presents the boring tools or drills to the end of, and forces them into the material for countersinking and drilling the nut blanks. To effect the stopping and boring operations, the turret slide is mounted on a slideway 8 and the turret is reciprocated and intermittently rotated by any suitable means timed to synchronize with the successive actions of the apparatus. Following the boring operation, the turret recedes clear of the nut blank material a sufficient distance to permit of the unobstructed action of the transfer mechanism and the cutters 3 then move into position to face the nut blank and sever it from the remainder of the bar.

While the turret, with the boring and stopping tools, is receding from the material, the cutters start the facing and severing operations, and at this stage the transfer mechanism is oscillating to a position opposite the nut blank. Before the cutters finish their operation the transfer mechanism comes into line with the nut blank and is reciprocated forwardly to engage the nut blank. When the cutting operation is finished the oscillation of the transfer mechanism is reversed to carry the nut blank to the tapping mechanism which, in the machine shown in the drawings, is located adjacent to, but separate from, the nut blank making mechanism.

This tapping mechanism comprises a chuck 9 and an elongated sleeve 10 which are rotatably mounted in bearings 11, attached to or forming part of the bed of the apparatus. Fixed on the sleeve 10 is a pulley 12, or other power transmission device, for rotating the sleeve and chuck. Floating within the chuck is a tap 13 provided with a shank or arm 14 which projects through and beyond the end of the sleeve 10 and is bent at right angles to the axis of the tap. The bent end 15 is entered in a stationary guide 16 disposed at right angles to the sleeve 10 and of an internal diameter corresponding to the external dimensions of the nut.

In the preferred construction this guide is of a tubular shape and its wall is formed with a plurality of apertures 17 which are shown to be in the same circumferential plane. Partially entered through each aperture is an anti-friction ball 18 extending for a short distance into the bore of the guide, and these balls are yieldingly maintained in the apertures 17 by a spring band 19 which permits of their outward displacement when subjected to pressure by the nuts passing through the guide. To support the shank 14 during the passage of the nuts from the tap to the guide 16, an idler 76 is mounted on a pin 77 journalled in lugs 78 adjustably connected with the guide 16, and when properly adjusted this idler maintains the shank 14 axial to the sleeve 10.

The point of the tap 13 extends to the outer end of the chuck 9, or it may extend slightly beyond it, to immediately enter the bore of the nut blank 21, when presented by the transfer mechanism, to the chuck. To provide for the use of the same sleeve with a wide range of nut sizes, the chuck may be detachably connected to the sleeve and this is conveniently accomplished by constructing each chuck with a screw threaded boss 22 of an external diameter corresponding to the recess 20 of the sleeve and screw threading the recess 20 to receive the boss. This permits of any one of a plurality of interchangeable chucks being fitted to the same sleeve, and as each chuck is intended for a special size and shape of nut the employment of these interchangeable chucks enables the same sleeve to be used for a wide range of nut sizes. For these variations of nut sizes the sleeve is provided with interchangeable and removable liners 23, and the internal diameter of each liner is of corresponding cross sectional dimension to the bore of the chuck. Each nut blank when transferred from the blank making operation to the tapping operation is presented to and pressed into the chuck by the transfer mechanism during which the tap enters the bore of the nut blank and starts the cutting of the thread. The chuck corresponds in shape and cross-sectional dimension to the external surface of the nut blank and when the latter is pressed into the chuck it rotates with the chuck. The tap and its shank or arm are unsupported, and float, in the chuck and sleeve, respectively, but are prevented from lateral, axial, and rotational movement by means of the bent end of the arm and the stationary guide, so that the rotation of the nut blank with the chuck will enable the tap to perform the nut threading operation and work the nut axially to and along the shank. The nut blank in the chuck centers the tap in its bore, and maintains the axial relation of the tap and shank with the chuck and sleeve during the threading operation. Each nut when being threaded moves along the tap to the shank and each succeeding nut forces the preceding nuts lengthwise along the shank 14 to the bend 15 and into the stationary guide 16 through which their movement is retarded by the spring pressed anti-friction balls 18. These balls, by retarding the passage of the finished nuts through the stationary guide, enable them to lock the bent arm against lateral movement within the guide, and prevent the rotation of the shank or arm 14 and the tap 13 within the sleeve 10 and chuck 9. The vertical displacement of the arm 15 within the stationary guide 16 is limited by the nuts on the shank or arm 14 between the bend and the tap engaging the sleeve or its liner as the case may be. The pressure of the nuts moving along the shank or arm 14 and bend 15 exerts sufficient force on that nut in contact with the balls 18 to push it past them, the spring 19, yielding sufficiently to allow the nut to clear them, and then, restoring the balls to their normal position when the nut has passed them. The nuts when pushed past the balls 18 are discharged from the machine.

The chuck 9 is of corresponding cross-sectional shape and dimensions to the nut blank being tapped and when the nut blank is entered in the chuck 9 it forms a snug but easy fit with it. This enables the nut blank to rotate with the chuck during which the tap threads the nut blank and works it axially towards the shank 14.

To co-ordinate the nut blank making operation and the nut tapping operation the nut blanks are carried from the blank making operation to the tapping operation by a transfer device, the movements of which are timed to synchronize with the blank making operation. While this transfer may be effected by various mechanical means, a device suitable for the apparatus shown in the present application comprises a rock shaft 24, rotatably and slidably mounted in bearings 25, 25$^a$ and 25$^b$, forming part of a bed plate 26. The rock shaft 24 is provided with a collar 27 interjacent the bearings 25$^a$ and 25$^b$, and is encircled by a spring 28 which bears against the collar 27 and the adjacent bearing 25$^a$ and causes the receding or backward reciprocation of the rock shaft, the direction of which is shown by arrow in Fig. 3.

Mounted in hangers 70 forming part of the bed plate 26 is a stud 32 on which is loosely fulcrumed a lever arm 30 for engaging the collar 27 and this lever is formed with a lug or arm 71 extending beyond the stud 32. Loosely mounted on the stud 32 is a lever arm 72 connected with the lug or arm 71 by a shearing pin 73. Mounted on bearings 74 is a cam shaft 75 and fixed on this shaft is a cam 31. The lever arm 72 has a roller 76 engaging the cam 31 by which the rotation of the cam 31 actuates the lever arm 72 which in turn actuates the lever 30 and rocking it on its fulcrum 32 causes the advance or forward reciprocation of the rock shaft, the direction of which is counter to the direction shown by arrow in Fig. 3 and holds it in that position while the transfer mechanism is taking the nut blank from the blank making mechanism, and also while the transfer mechanism is carrying it to the chuck for the tapping operation, as shown in Fig. 1, the timing of the cam being such as to insure the successful performance of these functions. Fixed on the rock shaft 24 is an arm 33 provided with a carrier attachment. This carrier attachment comprises a cylindrical housing 34 having a lug 35 by which it is bolted to the arm 33. The bore of the housing has two diameters, the larger part 37 of which is at the outer end of the housing, and the smaller part 39 of which extends from the larger part 37 to the inner end of the housing. Within the larger part of the bore is a plunger 36 of corresponding dimensions to it, and this plunger is formed with an extension 38, the external diameter of which corresponds to the smaller part 39 of the bore. The plunger 36 has a sliding movement in the bore and normally projects slightly beyond the outer face of the housing 34. In the extension 38 is a slot 40 and entered through the housing is a screw 41 which projects into the slot 40. The length of the slot 40 and the position of the screw 41 limits the movement of the plunger 36 beyond the face of the cylindrical housing 34. The plunger 36 and the extension 38 have an axial bore 42, and movable lengthwise of the bore 42 is a mandrel or pin 43. This mandrel or pin has a tapered end so that it will readily enter the bore of the blank and is formed with a plurality of expansible sections pressed outwardly by springs 90 so that when it is entered in the bore it will expand and prevent the accidental or inadvertent displacement of the blank from the transfer mechanism during its carriage between the two operations. The pin or mandrel is also provided with an elongated screw 44 which extends through and beyond the rear end of the housing and movable on the screw is an adjustable stop or nut 45. Encircling the screw 44 is a spring 46 which bears against the inner face of the housing 34 and against the inner end of the mandrel or pin 43 and presses the latter outward to extend beyond the face of the plunger 36, this outward movement of the mandrel or pin being limited by the engagement of the nut 45 with the adjacent face of the housing. Encircling the spring 46 is a spring 47 which bears against the inner end of the extension 38 and the inner face of the housing and presses the plunger 36 outwardly beyond the outer face of the housing to the limit permitted by the length of the slot 40, and the position of the screw 41 entered in it. By means of the springs 46 and 47 the plunger 36 and the mandrel or pin 43 are projected beyond the housing when the rock shaft 24 is oscillating between the two operations to effect the carriage of the nut blanks from the blank making operation to the tapping operation. On the rock shaft, between the bearings 25, 25ª, is a collar 29, and fulcrumed to the bed plate 26 between the bearings 25 and 25ª is a lever, one arm 49 of which is forked. The forks are positioned at opposite sides of the collar 29 and a pin or rod 50 is entered through the collar 29 and forked arm 49. The other arm 51 of the lever extends below the bed plate, and is engaged by a cam 52 which effects the oscillation of the rock shaft, through the medium of the lever and the collar 29. This cam 52 is timed to oscillate the rock shaft for the movement of the arm 33 in the direction of the blank forming mechanism when the turret recedes after the boring operation. The rock shaft, during this oscillation, is at the limit of its receded reciprocation, as shown in dotted lines in Fig. 3, so that the mandrel or pin 43 and the plunger 36 will be clear of all intervening parts of the mechanism and also of the nut blank held by the chuck of the blank making mechanism. When the mandrel or pin 43 comes into line with the bore of the nut blank, at the blank making position, the cam 31 reciprocates the rock shaft forwardly, but not to the limit of its advanced position, as shown in full lines in Figs. 2 and 3 and in dotted lines in Fig. 1, and this reciprocation of the rock shaft enters the mandrel or pin 43 in, but not to the full depth of, the bore of the nut blank. The timing of the cam 31 is such that the rock shaft and the carrying parts of the transfer mechanism remain at this forward reciprocation for a sufficient length of time to insure the completion of the severance of the finished nut blank from the bar. The cam 52 then operates through the levers 49, 51, to reverse the oscillation of the rock shaft 24, and bring the mandrel or pin 43 and the nut blank carried by it into axial alignment with the chuck 9 of the tapping mechanism, the cam 31 continuing to hold the rock shaft 24 in the advanced position shown in full lines in Figs. 1 and 3. The cam 31 then operates to move the rock shaft to the limit of its advanced reciprocation, as shown in dotted lines in Fig. 2, and in full lines in Figs. 5 and 6. During this movement the plunger 36 presses the nut blank against the chuck 9, and holds it there until it enters within the chuck, and the tap has started the formation of the thread. Owing to the rotation of the chuck 9 there may be a momentary delay in the entry of the nut blank into the chuck and to compensate for this delay and to avoid damage to the parts, by the advanced reciprocation of the transfer mechanism during the delay, the above described provision is made by which the plunger 36 and the mandrel or pin 43 can recede within the housing. During the receding movement within the housing the plunger maintains a pressure upon the nut blank and continues to press it against the chuck until it ultimately enters it and the tap enters the bore of the nut blank. The formation of the cam 31 is such as to permit of the elapse of a sufficient time period to insure, not only, the nut blank being effectively entered within the chuck, but also of, the tap starting to thread the bore. When this time period has elapsed, the cam 31 releases the lever 24 and the spring 28 moves the rock shaft back to the limit of its receded reciprocation, as shown in dotted lines in Fig. 3, and it is in this receded reciprocated position that the transfer mechanism oscillates to the blank making position.

When the transfer mechanism moves away from the nut blank making operation, the turret again advances towards the blank material and presents the stopping tool 5 to the end of the bar and the advance reciprocation of the turret and the adjustment of the stopping tool determines the depth of the nut. The turret is then intermittently rotated to successively bring the countersink and boring tools into alignment with the blank material, and the advance or forward reciprocation of the turret and countersink and boring tools is continued until the material is bored to the requisite depth. It is during this movement of the turret that the transfer mechanism effects the delivery of the nut blank to the tapping mechanism, and on the completion of the boring operation, the turret recedes or is retracted a sufficient distance to permit of the transfer mechanism coming into position to receive the nut blank that has just been bored. During the receding movement of the turret, the transfer mechanism oscillates from the tapping operation to the nut blank making operation, and during this movement of the transfer mechanism, the cutters start to sever the nut blank from the remainder of the material.

When the transfer mechanism is at the limit of its last mentioned oscillation, and has been reciprocated forwardly, a sufficient time is permitted to elapse for the completion of the severance of the nut blank from the material before its oscillation is reversed and the nut blank is carried to the tapping mechanism. The turret is then reciprocated forwardly as and for the purpose previously described.

Having thus fully described my invention what I claim as new and desire to secure by Letters Patent is:

1. In a nut making machine the combination with nut blank making means, and nut tapping means separate from the blank making means comprising a continuously rotatable chuck and a stationary tap therein, of an oscillatory arm for transferring the nut blanks successively from the blank making means to the tapping means, and means for causing the oscillation of the arm between the blank making means and the tapping means.

2. In a nut making machine the combination with nut blank making means, and nut tapping means separate from the blank making means comprising a continuously rotatable chuck and a stationary tap therein, of an oscillatory-reciprocatory arm, means for causing the oscillation of the arm between the blank making means and the tapping means for transferring the nut blanks successively from the blank making means to the tapping means and means for causing the reciprocation of the arm for delivering the blanks thereto to be threaded by the tap.

3. In a nut making machine the combination with nut blank making means, and nut tapping means separate from the blank making means comprising a continuously rotatable chuck and a floating stationary tap therein, of an oscillatory-reciprocatory arm, means for causing the oscillation of the arm between the blank making means and the tapping means, and means for causing the reciprocation of the arm for transferring the nut blanks successively from the blank making means to the tapping means, and pressing them on the stationary tap.

4. In a nut making machine the combination of nut blank making means, nut tapping means separate from the blank making means, and a carrier for delivering the nut blanks in successive order from the nut blank making means to the tapping means comprising an oscillating arm having a resilient pin to enter the bore of the nut blank and a plunger engaging the nut blank for resiliently pressing it against, and delivering it to the nut tapping means.

5. In a nut making machine the combination of nut blank making means, nut tapping means separate from the blank making means, and a carrier for delivering the nut blanks in successive order from the nut blank making means to the tapping means comprising an oscillating arm, having an expansible pin to enter the bore of the nut blank and a plunger engaging the nut blank for resiliently pressing it against, and delivering it to the nut tapping means.

6. In a nut making machine, the combination with nut blank making means, and nut tapping means separate from the nut blank making means comprising a resiliently rotatable chuck, a floating tap therein, a guide for receiving the nuts from the tap, an idler supported by the guide for maintaining the axial relation of the tap to the chuck, and means for transferring the nut blanks successively from the making means to the tapping means.

7. In a nut making machine the combination of the nut blank making means, nut tapping means separate from the blank making means, comprising a continuously rotatable chuck, a floating tap therein having an elongated shank with a bent end, a guide angularly disposed to the chuck in which the bent end of said shank is entered, said guide having an apertured wall with anti-friction balls partially entered through said apertures and a spring for yieldingly holding the anti-friction balls in said apertures, and means for transferring the nut blanks successively from the blank making means and delivering them in succession to the tapping means.

8. In a nut making machine the combination of the nut blank making means, nut tapping means separate from the blank making means comprising a rotatable sleeve, a chuck detachably and interchangeably connected with the sleeve, removable and interchangeable linings for the sleeve, a tap having an elongated shank extending through and beyond the sleeve and formed with a bent end angular to the axis of the tap, a stationary guide angular to the axis of the sleeve and chuck in which the bent end of the shank is entered, and means for transferring the nut blanks successively from the blank making means to the tapping means.

9. In a nut making machine, the combination of a nut blank making mechanism, a tapping mechanism comprising a rotatable nut blank holder and a stationary tap within and extending axially of the holder for receiving the nut blanks to be operated on, said nut blanks serving to centralize and locate the tap with operative relation to the work, and means for conveying the nut blanks from the blank making mechanism to the tapping mechanism comprising an oscillatory arm, and means for causing the arm to oscillate between said mechanisms, for the delivery of the nut blanks in succession from the blank making mechanism to the tapping mechanism.

10. In a nut making machine, the combination of a nut blank making mechanism, a tapping mechanism comprising a rotatable nut blank holder and a stationary tap within and extending axially of the holder for receiving the nut blanks to be operated on, said nut blanks serving to centralize and locate the tap with operative relation to the work, means for conveying the nut blanks from the blank making mechanism to the tapping mechanism comprising an oscillatory arm, means for causing the arm to oscillate between said mechanisms, for the delivery of the nut blanks in succession from the blank making mechanism to the tapping mechanism, and means actuating said arm for pressing the nut blanks into the holder and on the tap.

11. In a nut making machine, the combination of a nut blank making mechanism, a tapping mechanism comprising a rotatable nut blank holder and a stationary tap within and extending axially of the holder for receiving the nut blanks to be operated on, said nut blanks serving to centralize and locate the tap with operative relation to the work, means for conveying the nut blanks from the blank making mechanism to the tapping mechanism comprising an oscillatory arm, means for causing the arm to oscillate between said mechanisms, for the delivery of the nut blanks in succession from the blank making mechanism to the tapping mechanism, means actuating said arm for pressing the nut blanks into the holder and on the tap, and means for causing the reciprocation of said arm, at one limit of its oscillation, for receiving the nut blanks from the nut blank making mechanism and at the other limit for delivering them to the tapping mechanism.

12. In a nut making machine, the combination of a continuously rotatable chuck, a stationary tap extending axially into the chuck, a nut blank making mechanism and means for automatically conveying the nuts from the blank making mechanism to the chuck and resiliently pressing them on the tap.

13. In a nut making machine, the combination of a continuously rotatable chuck, a stationary tap extending axially into the chuck, a nut blank making mechanism and means for automatically conveying the nuts from the blank making mechanism to the chuck and resiliently pressing them on the tap, said means comprising an oscillatory reciprocatory arm moving between the chuck and the blank making mechanism, means for causing the oscillation of the arm, and means for causing its reciprocation at one limit of its oscillation for receiving the nuts from the blank making mechanism, and at the other limit for delivering them to the chuck and tap.

14. A nut making machine as claimed in claim 12, in which the conveying means comprises an arm, mounted on a shaft which is adapted to be oscillated between the blank making mechanism and the chuck and to be reciprocated for feeding the nut blank to the chuck and tap.

15. A nut making machine as claimed in claim 13 in which the arm carries a spring-pressed plunger for supporting the nut during its carriage from the blank making mechanism to the chuck and for engaging the end of the tap when the nut is being transferred thereto.

16. A nut making machine as claimed in claim 13 in which the arm carries a spring-pressed plunger for supporting the nut during its carriage from the blank making mechanism to the chuck and for engaging the end of the tap when the nut is being transferred thereto, and a resilient sleeve slidably mounted upon the plunger, said sleeve being adapted to press the nut on the tap when the plunger engages the end of the tap.

17. In a nut threading machine the combination of tapping means comprising a tubular chuck and a stationary tap located in and extending axially of the chuck, with means for delivering the nuts to the tap and chuck comprising a reciprocatory movable arm having a spring pressed plunger for supporting the nut during its carriage to the tapping means and for engaging the end of the tap when the nut is being transferred thereto.

18. In a nut threading machine the combination of tapping means comprising a tubular chuck and a stationary tap located in and extending axially of the chuck, with means for delivering the nuts to the tap and chuck comprising a reciprocatory movable arm having a spring pressed plunger for supporting the nut during its carriage to the tapping means and for engaging the end of the tap when the nut is being transferred thereto, and resilient means for pressing the nut on the tap when the plunger engages the tap.

Dated at the city of Buffalo, in the county of Erie, and State of New York, this 19th day of December, A. D. 1925.

PETER H. F. SPIES.